J. J. Greenough,
Pegging Machine,

№ 269, Reissued July 4, 1854.

UNITED STATES PATENT OFFICE.

JOHN J. GREENOUGH, OF NEW YORK, N. Y.

IMPROVEMENT IN MACHINES FOR PEGGING BOOTS AND SHOES.

Specification forming part of Letters Patent No. 10,427, dated January 17, 1854; Reissue No. 269, dated July 4, 1854.

*To all whom it may concern:*

Be it known that I, JOHN JAMES GREENOUGH, of the city, county, and State of New York, have invented a certain new and useful machine for pegging or nailing boots, shoes, and other analogous articles or pieces of leather, &c.; and I hereby declare the following to be a description of the principle or character which distinguishes it from all other things before known, and of the usual manner of making, modifying, and using the same, it being understood that the various devices may be changed in their construction so that the device is retained.

Figure 1:
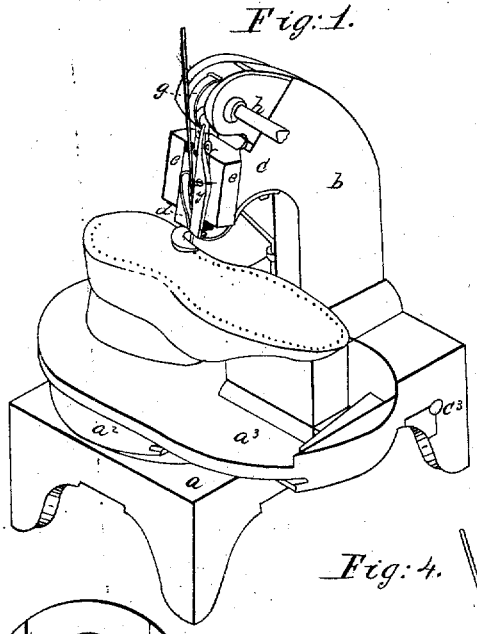
Figure 2:
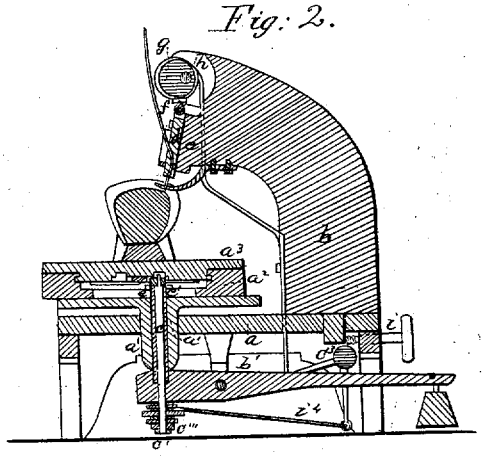
Figure 3:
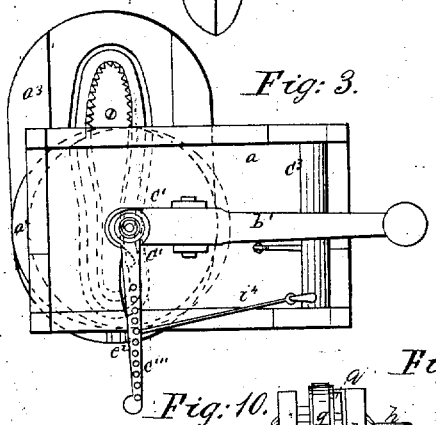
Figure 4:
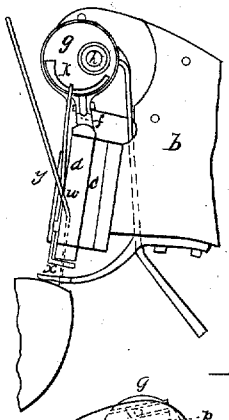
Figure 5:
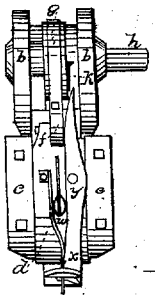
Figure 6:
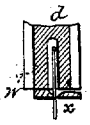
Figure 7:
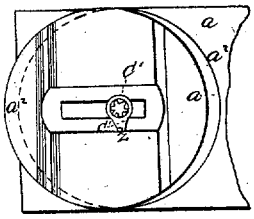
Figure 8:
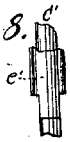
Figure 9:
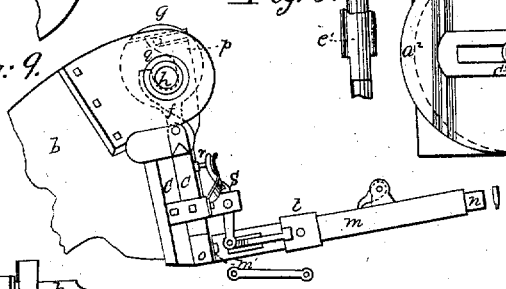
Figure 10:
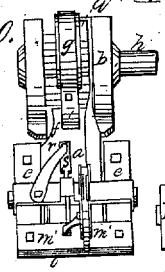
Figure 11:
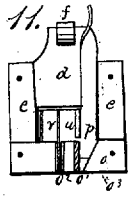
Figure 12:
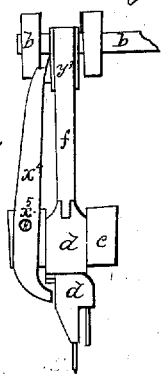
Figure 13:
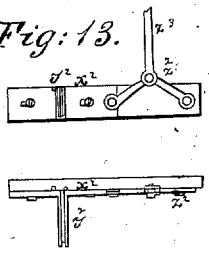

Figure 1 is a perspective view of the machine. Fig. 2 is a vertical section; Fig. 3, a plan of the under side of the platform; Figs. 4, 5, and 6, sections of wire-pegger; Fig. 7, carriage with top piece removed; Fig. 8, section of tube and shaft to move and guide the carriage; Figs. 9, 10, and 11, sections of wood-pegger; Fig. 12, section of lateral movement for the awl by which the shoe can be moved; Fig. 13, section of an apparatus for cutting metal pegs.

Like letters refer to the same parts in all the figures.

My invention consists of certain parts, hereinafter described in detail, which are for the purpose of forming and driving pegs of wood or metal into the soles of shoes, boots, &c., or other similar manufactures, and in moving the work up and guiding it to the pegging apparatus.

The construction is as follows: The basis or frame may be of any convenient form, one of which consists of a plane table, *a*, on legs. This table will not necessarily be, in a full-sized machine, more than one foot square, but may be made of any dimensions not too small for a steady support. About the center or other convenient point on this table *a*, at the rear side thereof, there is a standard, *b*, either firmly bolted to the table *a* or made to slide in ways thereon, as hereinafter described, and extending up and curving over toward the front. Its upper end is divided into two parts in which are the bearings of a shaft, *h*, by which the parts are moved. An arm or projection, *c*, stands out below the shaft a proper distance to support the ways of the sliding stocks of the awl and peg-driver. These stocks may slide in a line perpendicular to the plane of the shoe-sole, or at any angle thereto desired and to which it can be set, the purpose of the angle being to drive the pegs inclined inward. The stock *d* is made to slide in ways *e*, and is of any convenient form. It is connected by a pitman, *f*, with an eccentric, *g*, or other analogous device, so that the shaft *h* shall move it in both directions up and down. When the shoe-soles are to be pegged with wooden pegs, a long narrow trough is to be attached just below the stock *d*. When at its lowest point, of the following construction, (shown detached in Figs. 9, 10, 11,) the trough part *m* is made of thin sheet metal, its breadth and depth being about equal to the cross-section of the wooden peg, so that a strip of wood, *n*, out of which the pegs are formed, will readily slide through it. This trough has two flanges, *m'*, bent outward on either side at right angles to it and on the inner end, by which the trough is attached to the steel block *o*; or it may be fastened in any other convenient way. This block is an oblong piece of steel secured by screws to the arm *c* of the stationary standard *b*. In its face there is a groove cut, *o'*, opposite the opening of the trough, of sufficient breadth and depth to receive a peg, and beside it, at the distance the pegs are to be apart, there is a similar groove, *o''*, for the pegging-awl to play in, which is parallel to it. On the opposite side of the peg-groove *o'* there may be another groove, $o^3$, made at an angle of about thirty degrees to the peg-groove, as shown in the drawings. The knife has a flange on its back to fit the groove $o^3$, which as it works up and down forces the edge of the knife across the groove *o'* and cuts off the peg by a shaving-stroke. To make the edge of the knife inclined and the groove $o^3$ perpendicular would have the same effect, cutting perpendicularly, and not permitting the wood to split out angularly if the grain is crooked. The knife remains in the position across the groove *o'*, forming together with the groove the tube through which the peg is driven. The knife is moved by a cam on the shaft *h* above or eccentric, as shown at *q*, Figs. 9 and 10.

The operation of this part of the machine is as follows: As the stock rises the wood is fed into the groove *o'* by a continuous feed of spring or weight, or the device shown at Figs. 9 and 10, in which as the stock rises a small projection thereon at $r$ strikes the bent lever at $s$, which is connected to the slide $t$, and moves it forward. Two clamps or fingers attached to the slide $t$ enter slots in the sides of the tubes, so that when the slide moves forward the wood is fed into the groove $o'$, the knife is driven forward and cuts off a peg in the groove, and the piston $u$, attached to the stock and working up and down in the groove $o'$, thrusts the peg down into the shoe-sole below, while at the same time the awl $v$ makes a hole for the succeeding peg. The awl and piston are then drawn upward, succeeded by the knife, and a second peg is fed in, and so on till the work is completed.

When metal pegs are to be used instead of wooden ones, they may be similary cut and used from a flat strip, with this difference, that instead of the angular shaving motion with a thin knife there is attached to one side of the trough $y^2$, that contains the metal strip, a straight piece of steel, $x^2$, Fig. 13, which, with the stationary grooved piece, forms a shear. The cutter and trough are moved laterally by the toggle-joint $z^2$, worked by a rod, $z^3$, connecting with the eccentric or cam.

Sometimes I use a wire drawn to the figure the peg is to be, and then dispense with the trough and piston. I convey the end of the wire, after passing an ordinary straightening apparatus, down through a hole in the stock at $w$, Figs. 1, 5, and 6, where there is a cutting-nipper, $x$, attached to the stock, one jaw only of which is movable. The shank extends up to the eccentric, and the fulcrum is at $y$, the upper end of the shank being forced outward by a cam, $k$, or other suitable attachment, on the side of the eccentric or other convenient point.

The action is thus: The stock $d$ being drawn up to its greatest height, the wire projects below it sufficiently for a peg, and the cam striking the shank of the cutting-nippers causes them to cut into the wire, so as to take firm hold. The stock then descends, carrying the wire down and driving it into the sole or other material below. At the instant the peg is driven home the cutters are forced a little farther forward and the wire is cut entirely off. The form of the cutters sharpens the end of the wire to be driven at the next operation into a chisel form, so as to enter readily, even without a hole being first formed for it. The cutters then open by a spring or otherwise and rise above the end of the wire enough to again seize it for the next peg. It is obvious that the precise mechanism here described to produce the effect may have others substituted for it which would be equivalent to that described; but this I believe to be as simple as any and of easy construction.

That portion of the machine which brings the work up to the proper position to receive the peg may be constructed as follows: A hole is made through the table $a$ in front of the standard $b$, through which passes a cylindrical mandrel or rod, $a'$, on the top of which is a disk or plate, upon which there is another plate having a free sliding motion, and upon this the rest, with the boot, &c., clamped upon it, may be placed, with it having a free motion. These may be guided by slides or move freely upon the disk above named, by which I get a horizontal motion in any direction desired, or a revolution. The lower end of the mandrel $a'$ rests on a bearing on the end of a lever, $b'$, in such a way as to support it steadily while being raised and lowered by the lever. By bearing down the lever by weight or spring the work can be raised up to the desired position, or lowered. I thus form what I denominate a "universal carriage," having a free motion in all directions, so that a boot or shoe can be moved around in a line coincident to the pattern to which the sole is cut, and rise or fall according to the curve to which said sole is bent.

One of the modes of moving the upper plate, to which the shoe is attached automatically, is to form a groove on the under side of the plate, on the line, or nearly so, upon which the pegs are to be driven. A row of cogs follows the curve of the groove, as clearly represented in Fig. 3. A shaft, $c'$, extends up through the hollow mandrel, and its upper end enters the groove. Upon this shaft $c'$ there is a pinion the teeth of which gear into the cogs upon the plate, so that by turning the pinion the groove will be made to pass along over the shaft and be guided by it. A tube, $e'$, surrounds the shaft $c'$, and is affixed by its lower end to the lever $b'$, so that it cannot turn. On its upper end it bears a guide-pin outside the pinion, and at a sufficient distance from the end of the shaft to guide the course and turning of the shoe, keeping two points of the groove always in the same relative position in relation to the stationary parts of the machine, and causes the carriage to turn when the groove curves. The shaft $c'$ above named projects below the lever $b'$, on the lower end of which there is a ratchet-wheel with pawl and clutch attached to a horizontal lever $c^2$, by which the shaft and pinion are worked in one direction at intervals by means of the reciprocating motion of the lever, produced by its connection with the moving parts, which may be effected in the following way:

An axis, $c^3$, is placed horizontally under the platform or table $a$, to which are attached arms at right angles to each other. The vertical arm is attached by a rod, $i^4$, to the lever $c^2$, while the other arm is connected either with the pegging-stock or other moving part, so as to be vibrated, and thus move the upper plate of the carriage at intervals, leaving it at rest when the stock descends to drive the peg. A modification of the feed apparatus is to dispense with the pinion-shaft and connecting fixtures, simply guiding the work in the right direction, and instead of an up-and-down motion of the pegging-stock simply, I propose to give the pegging-awl a motion sidewise every time it is driven down into the work. This device is shown in one form in Fig. 12. The lower part of the pegging-stock is divided from the upper part, so as to slide laterally.

The operation is as follows: When the stock has descended and driven home the peg and pegging-awl, (at the same time,) as before described, a side lever, $x^4$, extending up beside the stock and having its fulcrum in the stationary frame at $x^5$, has its upper end struck by a side cam, $y^3$, on the eccentric, which causes it to force the pegging-awl sidewise while in the work, and thus carries the work along with it the breadth of the space required between the pegs. When the stock rises, it moves back to its original position. It will be obvious other devices may be substituted to move the awl sidewise when in the work, the novelty consisting in thus moving the work by the lateral motion of the awl. The standard *b* can be so attached to the bench that it can be made to slide in a right line to or from the center of motion of the carriage, or, in other words, so as to peg nearer to or farther from the edge of the work, so as to peg two rows, if desired, or instead thereof the guide which determines the course of the line of pegs can be so shifted, the standard remaining stationary.

I claim—

1. The automatic combination constituting my improved pegging-machine, and composed of the following elements or their mechanical equivalents enumerated in the succeeding claims, and comprising the peg-cutter, peg-driver, center guide, shoe movement, &c.

2. The cutting of the peg from the peg-blank by a lateral motion of the cutter against the side of the blank, the cutter assisting to hold the blank in position while it is driven, substantially as herein described.

3. The combination of parts composing the "universal-movement carriage," consisting of a disk supported upon the arm of a horizontal lever, so that it can be raised or lowered, surmounted by the device for holding the work, having a free motion in all directions, substantially in the manner and for the purpose described.

4. The center guide for directing the movement of the shoe or other article in the course indicated by the pattern of the sole, for the purpose of keeping the line of the pattern, as herein specified, so as to keep the line of the pattern coincident with that of the awl and peg-driver.

5. So constructing, arranging, and operating the shoe-carriage that each point of the sole which is to receive a peg shall be brought successively to the same point under the stationary pegging-standard, so that the pegging shall be effected without interruption entirely around the shoe or other article, substantially as herein described.

6. In combination with the movable carriage, the stationary pegging-standard made adjustable, or the equivalent of that adjustment, so that the pegs can be driven at any distance from the edge of the sole or center of motion of the carriage holding the material to be pegged, as above set forth, so that a new pattern will not be required to drive a second row of pegs within the first row.

7. Driving the pegs by a tool having a positive motion, as described, in both directions.

J. J. GREENOUGH.

Witnesses:
CHAS. G. PAGE,
SAML. GRUBB.